UNITED STATES PATENT OFFICE.

ALEXANDER COLLINS CAMPBELL, OF MOUNT MORRIS, NEW YORK.

IMPROVED METHOD OF TREATING CHOLERA.

Specification forming part of Letters Patent No. 53,407, dated March 27, 1866.

*To all whom it may concern:*

Be it known that I, ALEXANDER COLLINS CAMPBELL, of Mount Morris, in the county of Livingston and State of New York, have invented a new and Improved Method of Treating Cholera; and I do hereby declare that the following is a full and exact description thereof.

My method of treating cholera is based upon a theory, of which I claim to be the discoverer, that the disease is produced by an influence which acts primarily upon the ganglionic system of nerves in a peculiar manner, secondarily upon the capillary system of vessels, suspending their functions or paralyzing them, according to the intensity of the choleric influence, usually throwing open the mouths of those vessels and producing death by asphyxia, at other times causing death by totally annihilating the functions of the whole ganglionic system of nerves, as in debilitated and elderly persons. When death is produced by the capillaries being thrown open, permitting the serum of the blood to pass away, the death is the consequence, not of the poisonous influence of cholera directly, but by the influence of the carbon in the blood, which, from the draining off of the serum, has been deprived of its fluidity, producing an asphyxiated state of all the tissues in contact with the blood, and from total inability of the vessels to return it in such a state to the lungs, where it can be purified by the action of the oxygen upon it. Hence the blueness, coldness, prostration, stupor, and death which result. This theory is sustained by the fact that in the early diarrheal stage, before any considerable amount of serum has passed away, it can be arrested by very simple means, such as tincture of Cayenne pepper, paregoric and camphor, laudanum and camphor, brandy, and other stimulants, which of themselves could have nothing to do with neutralizing the poison did it exist in the blood, and can operate upon no principle except to give vigor temporarily to the nervous system and tone to the mouths of the relaxed capillary vessels, both internally and externally. The correctness of this theory is established by the fact that if the vessels are closed by any agent, as external friction or the above simple remedies internally administered, which have no power to change the qualities of the blood, the patients recover, when, if the disease depended upon the poison in the blood, the closing of the capillaries by which the poison is shut up in the system would prove more rapidly fatal. In short, the more the patient vomits and purges the serum of the blood the more certain and rapid will be the fatal termination. By the shutting up in the system of all other poisons death follows as a certain consequence of that act; but in cholera the reverse is the fact, which renders the conclusion certain that the blood is not the seat of the poison. Again, we are forced to believe in the correctness of this theory by the fact that when reaction occurs the same phenomena take place after a collapse that would if the collapse were produced by fear, or any medicine capable of producing it, as tartarized antimony, hydragogue cathartics, &c.,—to wit, heat of a low, burning character, as typhus or typhoid fever, which is due to the union of oxygen in the lungs with the carbon of the blood, in the extremely carbonized state of that fluid in the vessels, the system not having power to relieve the excessive heat from lack of serum in the blood, which acts as refrigerator by its evaporation. Hence the dryness of the skin, great thirst, smoldering fever, and extreme nervous prostration, all of which symptoms are in proportion to the previous blueness and poverty in serum of the case.

At the beginning of an attack of cholera, when the cause, if in the blood, might be supposed to be present in the system in its greatest force or quantity, it is found that the glands—viz., the kidneys, liver, salivary and other glands—secrete as usual; but as soon as the blood is changed, so as to become dark or supercarbonized, the secretions are entirely stopped. This is not because the elements of the secretions do not exist in the blood, but because the functions of the glands are suspended by the asphyxiated state of the blood-vessels. Hence, as soon as the circulation returns and the combination of oxygen and carbon restores the vitality of the blood, the secretions return in proportion to that restoration.

I claim that the cholera poison acts first upon the nerves that preside over the capillary vessels, and if the poison is largely present and the constitution feeble, so that the influence of the poison predominates, then the whole ganglionic system is paralyzed or its functions suspended, so as to destroy life at once. But if the constitutional power predominates over that of the poison the capil- laries are thrown open and the disease destroys in detail, as previously described.

My method of treatment consists of four parts: First, the preventive; second, remedial treatment in the early diarrheal stage; third, treatment in the stage of collapse; fourth, treatment in the stage of reaction.

First, as preventive. Take muriated tincture of iron, one ounce; quinine, five grains; strychnine, one grain. Mix and give from one to twelve drops, according to the age and strength and condition of the patient, four times in twenty-four hours, with a view of securing a healthy state of the blood, a vigorous condition of the nervous system, and giving tone to the mucous lining of the stomach and bowels. At the same time I would enforce proper regimen and diet.

Second. In the early diarrheal stage I administer the same prescription with ℞ laudanum, one ounce; tincture of Cayenne pepper, one ounce; pepperine, three to five grains, at from one to forty drops, according to the age, strength, and condition of the patient, once in from one to six hours, according to the urgency of the symptoms. In addition give calomel, one grain, and morphine one-quarter to one-half grain, once in four hours, till indications of its effects upon the glands are perceptible. Apply to the region of the liver a preparation of unguintum hydrargyrum, three parts; pulverized iodine, one part, thoroughly mixed, of which ointment apply over the place indicated a plaster as large as a dollar, for the purpose of expediting mercurial action and making strong revulsion to the surface. This should be persisted in until the patient is out of danger, with such variations as each case will suggest.

Third. In the collapse stage I would replace the serum of the blood by injecting into the veins artificial serum, prepared according to the well-known formula in works of chemistry, in sufficient quantity to render the blood as fluid as in health, and immediately after, through perforations made in the skin in various parts of the body, inject oxygen gas, by which the suboxidized blood in capillary vessels and small arteries and veins on the surface will become vitalized, closing the capillaries and producing warmth in the surface and energy in the twigs of the nerves that are distributed on the surface and control the mouth of the vessels. At the same time the patient should be made to breathe an atmosphere impregnated more or less with oxygen, and the same to be injected into the bowels, to be retained as long as possible, so as to obtain, as nearly as practicable, complete contact with the whole surface outside and in. While in the state of collapse, as soon as reaction begins the patient should swallow small portions of ice frequently, to guard the organs against the ravages of reaction from the consuming fire produced by the chemical changes taking place in the blood—viz., union of oxygen and carbon. I also apply an ointment composed of the before-mentioned ingredients—viz., unguintum and iodine, in equal parts in bulk, thoroughly pulverized and mixed, to the abdomen, in from three to six places, each of the size before stated, and kept on according to the necessities of the case. This is with the view to producing its alterative effect on the glands by absorption, and preventing concentration of the fluids in the weakened internal organs during the stage of excitement that is to follow.

Fourth stage. The patient should be supplied with the simplest and blandest articles of nourishment and drinks. Produce by friction or otherwise strong irritation of the surface over any congested organs. Use small portions of ice frequently repeated, and in plethoric persons scarify and cup or use leeches, and do all that is possible to restore to the blood the lost serum and enable the patient to eliminate the excess of carbon. Employ sheets wrung from tepid water, and after excessive thirst has subsided give mucilaginous drinks, together with diaphoretics and diuretics. The fourth stage is not one of fever, but a sequence of the disordered condition produced by the previous stages of the disease, and as such requires to be treated in a manner to aid nature in the process of elimination and restoration.

What I claim, and desire to secure by Letters Patent, is—

1. The preventive medicine, composed of the several ingredients and in substantially the proportions as described under the head of the first part of my method of treatment.

2. The same compound, with the addition of laudanum, tincture of Cayenne pepper, and pepperine, in substantially the proportions described, as a remedy in the diarrheal stages of cholera, as set forth.

3. The external application, composed of unguintum hydrargyrum and iodine, in combination with the internal remedies above named in the diarrheal stage of cholera, as described.

4. Injecting oxygen gas into the tissues of the body through perforations made in the skin, for the purpose of vitalizing the suboxidized blood in the capillary vessels and small arteries and veins and producing warmth of the surface, substantially as described.

5. Injecting oxygen gas into the tissues of the body, in combination with the injection of artificial serum into the veins, for restoring the fluidity of the blood and arterializing it in the small vessels remote from the heart and lungs, substantially as and for the purposes set forth.

6. As a whole, the within-described method of treating cholera, substantially as set forth.

In witness whereof I have hereunto signed my name in the presence of two subscribing witnesses.

A. C. CAMPBELL.

Witnesses:
REUBEN T. WISNER,
ALBERT G. WISNER.